US006213561B1

United States Patent
Witthaus

(10) Patent No.: US 6,213,561 B1
(45) Date of Patent: Apr. 10, 2001

(54) INTEGRAL TIRE AND DISC BRAKE ASSEMBLY FOR SCOOTER UTILITY VEHICLE

(75) Inventor: Charles Allison Witthaus, Hayward, CA (US)

(73) Assignee: Patmont Motor Werks

( * ) Notice: Subject to any disclaimer, the term of this patent is extended or adjusted under 35 U.S.C. 154(b) by 0 days.

(21) Appl. No.: 08/933,823

(22) Filed: Sep. 19, 1997

(51) Int. Cl.$^7$ .................................................. B60B 19/00
(52) U.S. Cl. ..................... 301/6.1; 152/324; 188/24.12; 280/11.2; 280/87.041
(58) Field of Search ..................... 152/323, 324; 188/24.12, 71.1; 280/11.2, 87.021, 87.041; 180/180, 181; 301/6.1

(56) References Cited

U.S. PATENT DOCUMENTS

| | | | |
|---|---|---|---|
| 1,145,209 | * 7/1915 | Nicol | 280/87.041 |
| 1,865,432 | * 7/1932 | Bossert | 152/323 |
| 4,166,519 | * 9/1979 | Maloney | 280/11.2 |
| 4,179,134 | * 12/1979 | Atkinson | 280/11.2 |
| 4,183,546 | * 1/1980 | Heilig | 280/11.2 |
| 4,761,014 | * 8/1988 | Huang | 280/87.041 |
| 4,799,701 | * 1/1989 | Lindau et al. | 280/87.041 |
| 4,799,702 | * 1/1989 | Wang | 280/87.041 |
| 4,943,075 | * 7/1990 | Gates | 280/11.2 |
| 4,951,958 | * 8/1990 | Chao | 280/87.041 |
| 5,039,121 | * 8/1991 | Holter | 280/87.041 |
| 5,251,965 | * 10/1993 | Johnson | 152/323 |
| 5,308,152 | * 5/1994 | Ho | 301/323 |
| 5,775,452 | * 7/1998 | Patmont | 280/87.041 |
| 5,848,660 | * 12/1998 | McGreen | 280/87.041 |

OTHER PUBLICATIONS

Photographs of the Zap Power Systems "Zappy" Scooter, which is the commercial embodiment of US Pat No. 5,848,660 issued to McGreen.

\* cited by examiner

*Primary Examiner*—S. Joseph Morano
*Assistant Examiner*—Long Bao Nguyen
(74) *Attorney, Agent, or Firm*—Shapiro Buchman Provine & Patton LLP; Mitchell S. Rosenfeld

(57) ABSTRACT

A small utility vehicle, such as a motorized scooter, has an attached vehicle supporting wheel. This wheel includes a solid rubber or plastic tire removeably mounted to a central hub. The tire when mounted to the hub rolls on the ground at a peripheral ground contact surface and defines on opposite sidewall surfaces with the solid mass of the tire there between. Each sidewall surface has periodically spaced grooves. A vehicle attached brake of the compression caliper type having two flat opposing brake shoe surfaces bears on the tire sidewalls to effect braking. During braking, one flat opposing brake shoe surface of the compression caliper bears on one sidewall surface and the remaining flat opposing brake shoe surface of the compression caliper bears on the remaining sidewall surface squeezing the solid mass of the tire there between. When the caliper is closed, friction between each sidewall and flat opposing brake shoe surface effects braking, with the result that the wheel tire serendipitous serves as the brake disc. The grooves at the sidewall surfaces on the wheel tire serve to wipe water and debris from the interface of the sidewall surfaces and compression brake shoe surfaces of the caliper brake to maintain constant friction.

3 Claims, 3 Drawing Sheets

INTEGRAL TIRE AND DISC BRAKE ASSEMBLY FOR SCOOTER UTILITY VEHICLE

Small motor driven scooters are known. One such small motor driven scooter is manufactured by the assignee herein, Patmont Motor Werks of Livermore, Calif. under the Registered Trademark Go-Ped®. Conventionally, braking on the Go-Ped® has been provided by a caliper type braking acting against conventional non-pneumatic rubber tire. Paired opposing flat caliper actuated brake shoe surfaces bear against a tire at the flat and otherwise unobstructed sidewalls of the tire. Practical difficulties have resulted from this arrangement.

Like the bicycle brake, calipers acting direct on the sides of a tire cause the brake to operate differently in different conditions. Where water is present, braking distance and force required to applying braking are both increased. Further, where dirt and dust particles were accumulated, further changes in both braking distance and force applied to the brake to effect stoppage are required.

Secondly, past wheel designs for the Go-Ped® require excessive amounts of rubber for the tire. At the same time, wheel wear under normal operating conditions requires both wheel and tire replacement. When wear of the wheel causes the wheel replacement, these excessive amounts of rubber are discarded.

Finally, the resulting rubber tire was expensive to mold. Large amounts of rubber used with the tire required excessive time for curing. Further, the excess rubber added unnecessary weight onto the utility vehicle product.

SUMMARY OF THE INVENTION

A small utility vehicle, such as a motorized scooter, has an attached vehicle supporting wheel. This wheel includes a solid rubber or plastic tire removeably mounted to a central hub. The tire when mounted to the hub rolls on the ground at a peripheral ground contact surface and defines on opposite sides rim surfaces with the solid mass of the tire there between. Each rim surface has periodically spaced grooves. These groves are slanted with respect to radial lines extending from the center of rotation of the wheel, this radial slant permitting the grooves to expel accumulated debris. A vehicle attached brake of the compression caliper type having two flat opposing brake shoe surfaces bears on the tire sidewalls to effect braking. During braking, one flat opposing brake shoe surface of the compression caliper bears on one sidewall surface and the remaining flat opposing brake shoe surface of the compression caliper bears on the remaining sidewall surface squeezing the solid mass of the tire there between. When the caliper is closed, friction between each sidewall and flat opposing brake shoe surface effects braking, with the result that the wheel tire serendipitously serves as the brake disc. The grooves at the rim surfaces on the wheel tire serve to wipe water and debris from the interface of the sidewall surfaces and compression brake shoe surfaces of the caliper brake to maintain constant friction. The slant of the grooves with respect to radial lines taken from the center of rotation of the wheel convey debris away from the caliper and tire interface. Tire replacement effects brake relining. There results a uniquely functional all weather and ground condition disc brake having direct braking action to a replaceable scooter tire.

First, the brake with the grooves improves braking considerably. In wet conditions, significantly improved braking results in the stopping distance being reduced 15% to 20%. At the same time, the grooves in the wheels reduce tire weight.

Secondly, it is possible to reduce size of the tire by about 30%. This is done by expanding the central hub diameter. This utilizes less material on the tire and reduces the cure time of each individual tire on the order of 50%. It further reduces the overall weight of the scooter vehicle by 5%.

Surprisingly, the resulting tire enables replacement wheels to existing scooters. At the same time, new scooters can maintain the same hub and only be fitted with a replacement tire. In the latter case, tire replacement is reduced to one third the cost of wheel replacement.

The wheel and hub of this invention can retrofit existing Go-Ped® scooters. The tire herein is mounted to a one piece plastic hub which is injection molded. This hub fits the conventional product.

DESCRIPTION OF THE PREFERRED EMBODIMENT

Figure 1A:
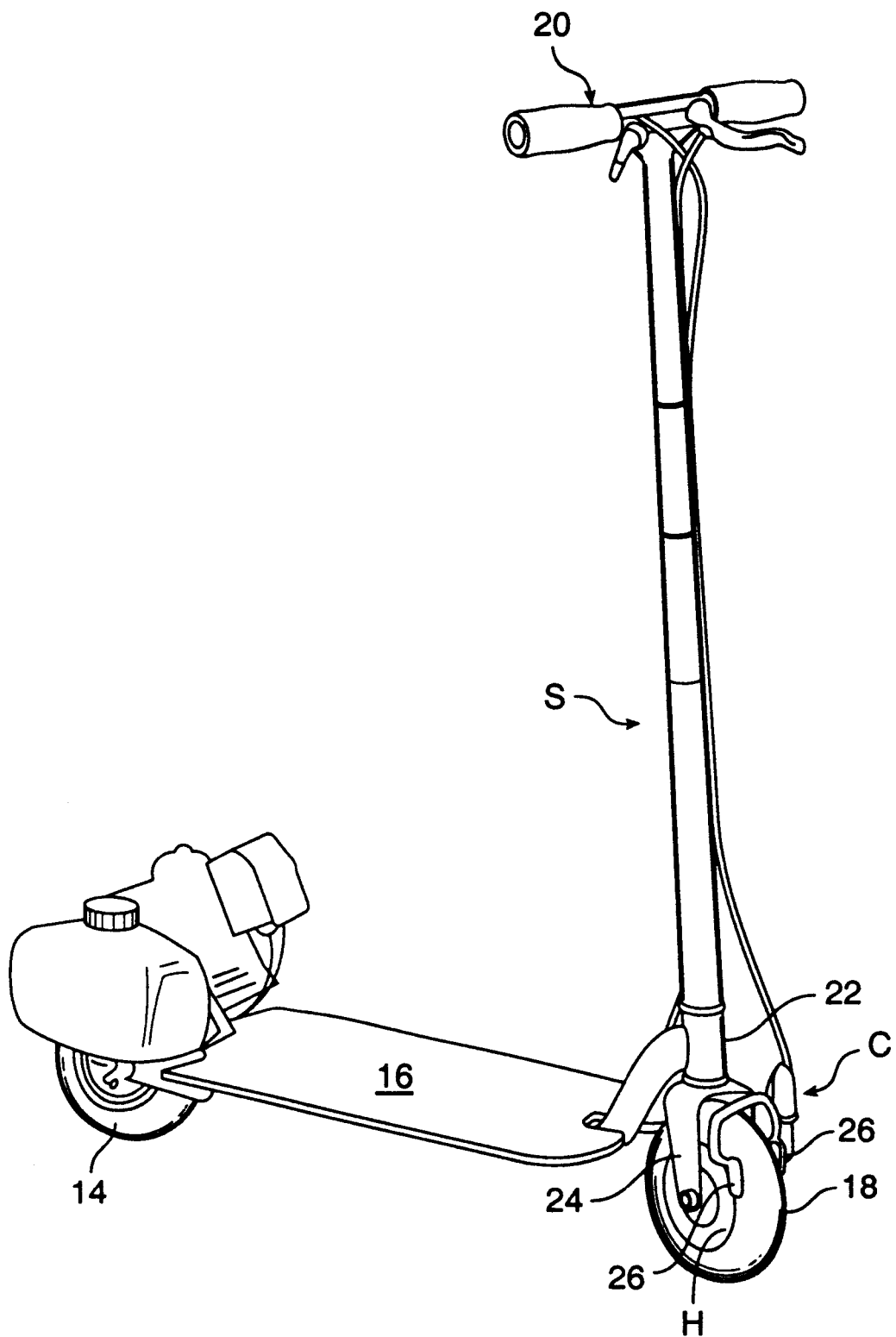
FIG. 1A is a perspective view of a Go-Ped® motorized scooter of the prior art illustrating the rear driven wheel and the front braked wheel utilizing the wheel of this invention.

Referring to FIG. 1, a perspective view of scooter S is shown. Scooter S has rear driving wheel 14, scooter body 16, and front steering wheel 18. Front steering wheel 18 is mounted at the bottom of steering handle 20 which rotates within steering bearing 22. Steering handle 20 has below steering bearing 22 conventional wheel mounting yoke 24. Mounted to one side of conventional wheel mounting yoke 24 is caliper brake C having bare metal pads 26. As will hereafter be understood, it is the action of pads 26 with grooves on front steering wheel 18 which provide the improved brake action of this invention. Caliper brake C is conventional except for the ends of each caliper constituting bare metal.

Figure 1B:
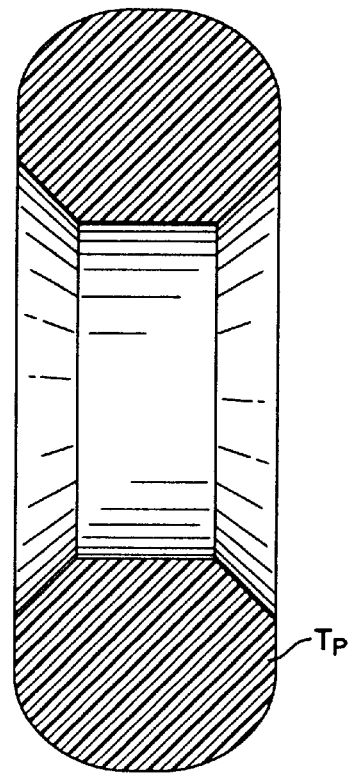
FIG. 1B is a section view taken through the wheel utilized with the Go-Ped® scooter of the prior art illustrating in cross section the required rubber for the tire.

Referring to FIG. 1B, the tire of the prior art is illustrated. Two important points about this tire must be emphasized.

First, prior art tire $T_p$, does not have any kind of radial grooves on the sides or rims of the tire. It was found that in actual operating conditions, such as encountering rain and mud, braking distance increased. Further, brake operation was erratic.

Second, prior art tire $T_p$ required replacement of the entire wheel; it was not possible just to replace the tire over hub H (see FIG. 1A).

Figure 2A:
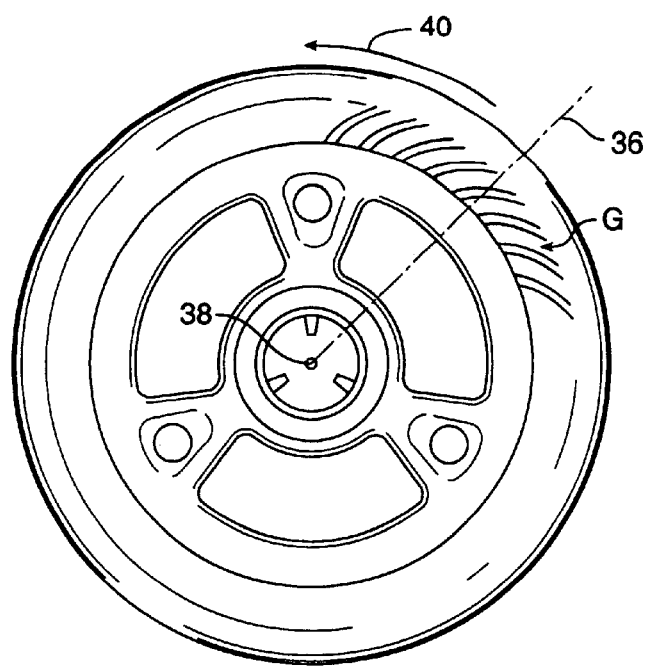
FIG. 2A is a side elevation view of the wheel of this invention.
Figure 2B:
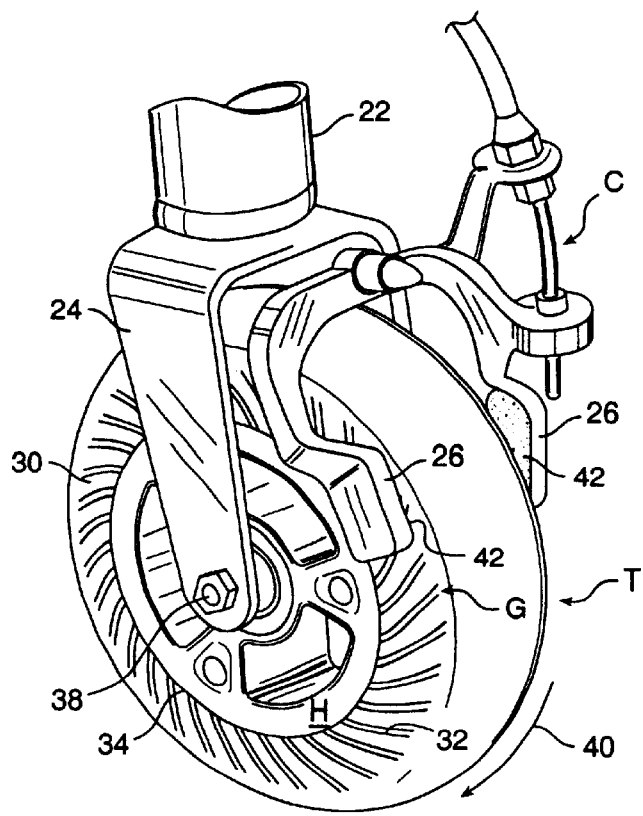
FIG. 2B is a perspective view of the caliper pads and tire illustrating the self cleaning action imparted by the tire sidewall grooves acting on the caliper pads; and, FIG. 3 is a section view of the wheel of this invention illustrating the reduced rubber utilized in the tire and the efficiency of the replaceable tire of this invention.

Referring to FIG. 2A, ribbed tire T is illustrated. It will be seen that tire side walls 30 have radially slanted ribs 32 configured within tire rim 34. Observing radial line 36 taken through center of wheel rotation 38, it will be seen that tire sidewall grooves G are at an angle with respect to radial line 36. Further, it will be seen that ribbed tire T rotates in the direction of radial arrow 40. Tire sidewall grooves G are slanted to spiral radially outward with respect to radial line 36. That is to say, as tire sidewall grooves G pass radial line 36 during rotation of ribbed tire T, the channel defined by tire sidewall grooves G first encounters radial line 36 towards center of wheel rotation 38, and thereafter the channel defined by tire sidewall grooves G moves radially outward from center of wheel rotation 38. The reader will understand that this radially outward motion co-acts with the flat metallic surface of caliper pads 42. Specifically, debris and moisture trapped in the interface between caliper pads 42 and tire side walls 30 are conveyed out of the interface between caliper pads 42 and tire side walls 30. This can be best seen with reference to FIG. 2B.

Figure 3:
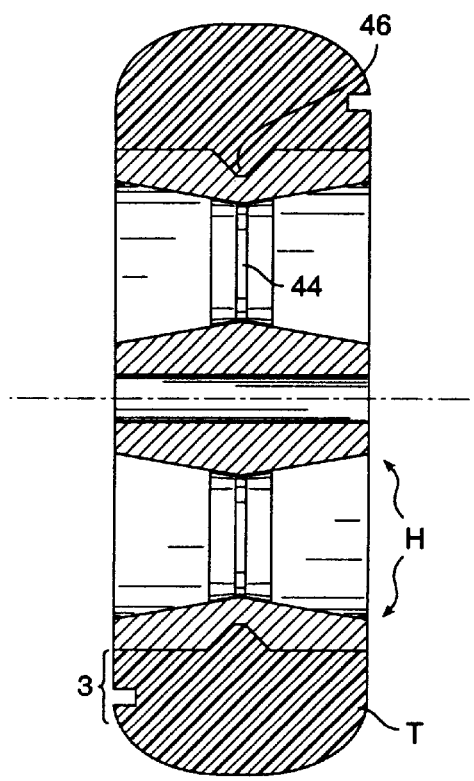

Referring to FIG. 3, it will be seen that the cross-sectional profile of ribbed tire T has been reduced. Specifically hub H defines inner grove 44 into which complimentary central groove 46 from ribbed tire T extends. This interaction between inner groove 44 and complimentary central groove 46 enables tire replacement while hub H no longer needs such replacement.

What is claimed is:

1. A wheel and integral disc brake assembly for a small utility vehicle comprising:

an axle mounted to the vehicle for supporting the vehicle from the wheel as the wheel rolls over a supporting surface;

a rotating central hub rotated on the axle at a center and having a sidewall for receiving a tire on a periphery of the hub;

a tire removably mounted to the rotating central hub, the tire when mounted to the rotating central hub at the periphery having a peripheral ground contact surface and defines on opposite sides thereof two sidewall surfaces with a solid mass of tire there between;

each sidewall surface having periodically spaced grooves disposed on the sidewall surfaces; and a vehicle attached brake having compression calipers with two flat opposing brake shoe surfaces for bearing on the two sidewall surfaces to effect braking, one flat opposing brake shoe surface of the compression calipers bearing on one sidewall surface and a remaining flat opposing brake shoe surface of the compression calipers bearing on a remaining sidewall surface whereby when the compression calipers are closed, the periodically spaced grooves at the sidewall surfaces on the tire serve to wipe water and debris from interfaces of the sidewall surfaces and compression brake shoe surfaces of the compression calipers to maintain constant braking friction;

wherein the grooves on the tire are slanted with respect to a radial taken through the axle of the wheel to expel debris from an interface between the tire sidewalls and the compression calipers; and wherein the periodically spaced grooves are slanted opposite to rotation of the rotating central hub.

2. A wheel and integral disc brake assembly for a small utility vehicle comprising:

an axle mounted to the vehicle for supporting the vehicle from the wheel as the wheel rolls over a supporting surface;

a rotating central hub rotated in the axle and having a tire on a periphery of the hub;

a tire mounted to the rotating central hub, the tire having two sidewall surfaces with a ground engaging surface there between;

each sidewall surface having periodically spaced grooves; and a brake having compression calipers with two flat brake shoe surfaces for contacting the two sidewall surfaces to effect braking;

wherein the periodically spaced grooves are slanted with respect to a radial taken through the axle of the wheel to expel debris from an interface between the tire sidewalls and the compression calipers; and wherein the periodically spaced grooves are slanted opposite to rotation of the rotating central hub.

3. A wheel and integral disc brake assembly for a small utility vehicle comprising:

an axle mounted to the vehicle for supporting the vehicle from the wheel as the wheel rolls over a supporting surface;

a rotating central hub rotated in the axle and having a tire on a periphery of the hub;

a tire mounted to the rotating central hub, the tire having two sidewall surfaces with a ground engaging surface there between;

each sidewall surface having periodically spaced grooves slanted opposite to rotation of the rotating central hub;

a brake having compression calipers with two flat brake shoe surfaces for contacting the two sidewall surfaces to effect braking.

* * * * *